US012605832B2

(12) United States Patent     (10) Patent No.:   US 12,605,832 B2

Gaschler et al.     (45) Date of Patent:   Apr. 21, 2026

(54) ROBOTIC CONTROL WITH REAL-TIME SWITCHING BETWEEN TRAJECTORIES

(71) Applicant: Intrinsic Innovation LLC, Mountain View, CA (US)

(72) Inventors: Andre Gaschler, Munich (DE); Markus Giftthaler, Freising (DE)

(73) Assignee: Intrinsic Innovation LLC, Mountain View, CA (US)

( * ) Notice: Subject to any disclaimer, the term of this patent is extended or adjusted under 35 U.S.C. 154(b) by 64 days.

(21) Appl. No.: 18/545,986

(22) Filed: Dec. 19, 2023

(65) Prior Publication Data

US 2024/0208059 A1     Jun. 27, 2024

Related U.S. Application Data

(60) Provisional application No. 63/435,507, filed on Dec. 27, 2022.

(51) Int. Cl.
    B25J 9/16     (2006.01)
(52) U.S. Cl.
    CPC .................................. B25J 9/1664 (2013.01)
(58) Field of Classification Search
    CPC .................. B25J 9/1664; B25J 9/1661; G05B 2219/39209; G05B 2219/40102; G05B 2219/40395
    See application file for complete search history.

(56) References Cited

U.S. PATENT DOCUMENTS

| | | | |
|---|---|---|---|
| 10,596,700 B2 * | 3/2020 | Corkum .............. | G05B 19/423 |
| 12,165,019 B2 * | 12/2024 | Kishimoto ............. | G06F 17/18 |
| 12,172,318 B2 * | 12/2024 | Guymon ............... | B25J 11/005 |
| 2020/0174455 A1 * | 6/2020 | Fox .................. | G06Q 10/06311 |
| 2021/0362333 A1 | 11/2021 | Kolluri et al. | |
| 2022/0347841 A1 * | 11/2022 | Gaschler .............. | B25J 9/1682 |
| 2022/0347846 A1 | 11/2022 | Gascheler et al. | |
| 2024/0139961 A1 * | 5/2024 | Gaschler ............... | B25J 9/1697 |
| 2025/0018570 A1 * | 1/2025 | Shazly .................. | B25J 9/1664 |

OTHER PUBLICATIONS

Real Time Perception Meets Reactive Motion Generation (Daniel Kappler et al (Year: 2017).*

* cited by examiner

*Primary Examiner* — Masud Ahmed
(74) *Attorney, Agent, or Firm* — Fish & Richardson P.C.

(57) ABSTRACT

Methods, systems, and apparatus, including computer programs encoded on computer storage media, for switching in real-time between different trajectories during custom real-time control. One of the methods include: obtaining a definition of a first trajectory for a robot and a definition of a second trajectory for the robot; executing a current action for controlling the robot to follow set points of the first trajectory at each control tick of the real-time robotic control system, including, at each control tick of the real-time robotic control system: obtaining current data representing a latest execution status of the current action; evaluating one or more switching criteria associated with the current action according to the current data; and whenever the one or more switching criteria are satisfied during the control tick, switching to executing another action for controlling the robot to follow the second trajectory within the control tick.

22 Claims, 3 Drawing Sheets

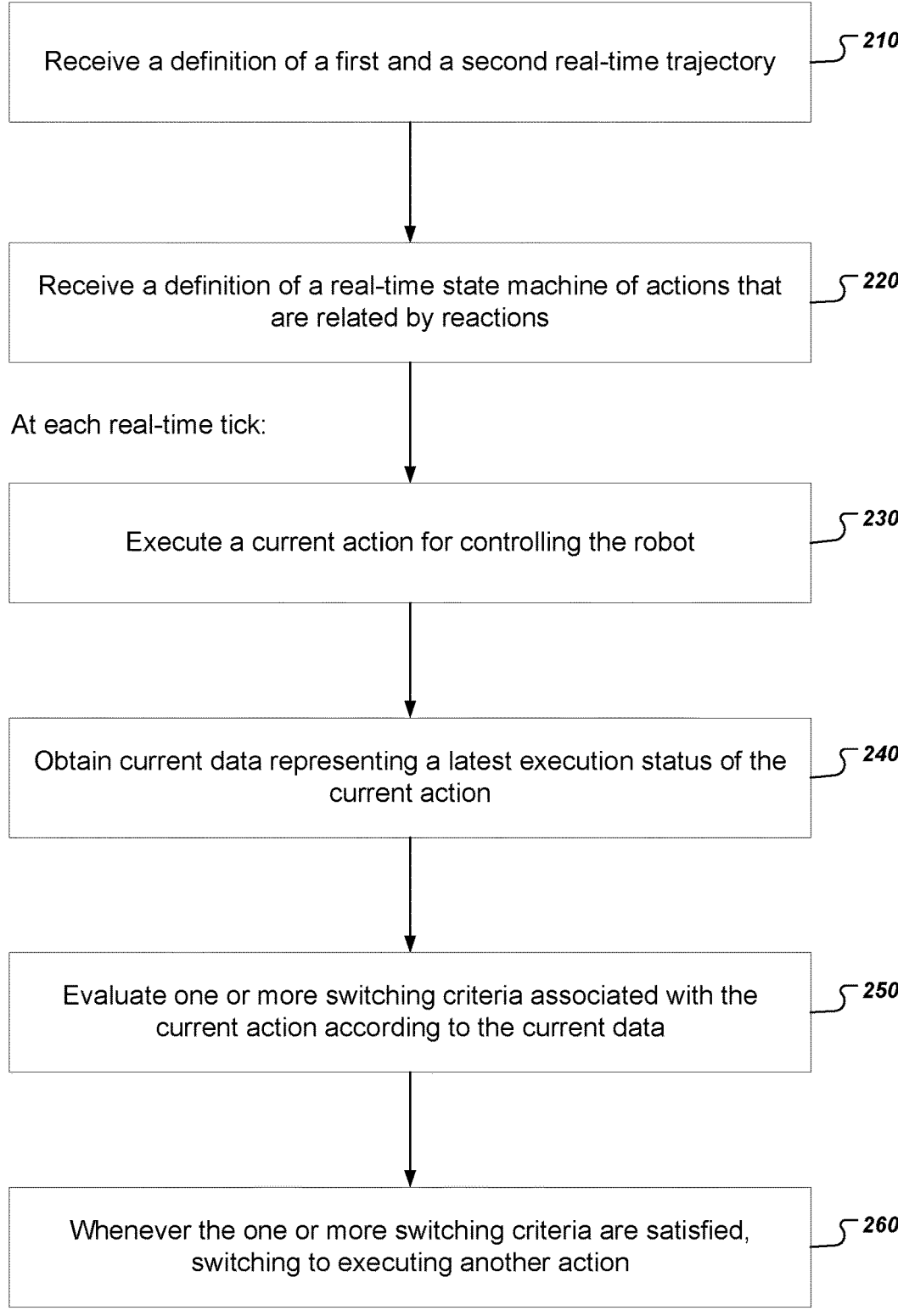

200

Receive a definition of a first and a second real-time trajectory — 210

Receive a definition of a real-time state machine of actions that are related by reactions — 220

At each real-time tick:

Execute a current action for controlling the robot — 230

Obtain current data representing a latest execution status of the current action — 240

Evaluate one or more switching criteria associated with the current action according to the current data — 250

Whenever the one or more switching criteria are satisfied, switching to executing another action — 260

FIG. 2

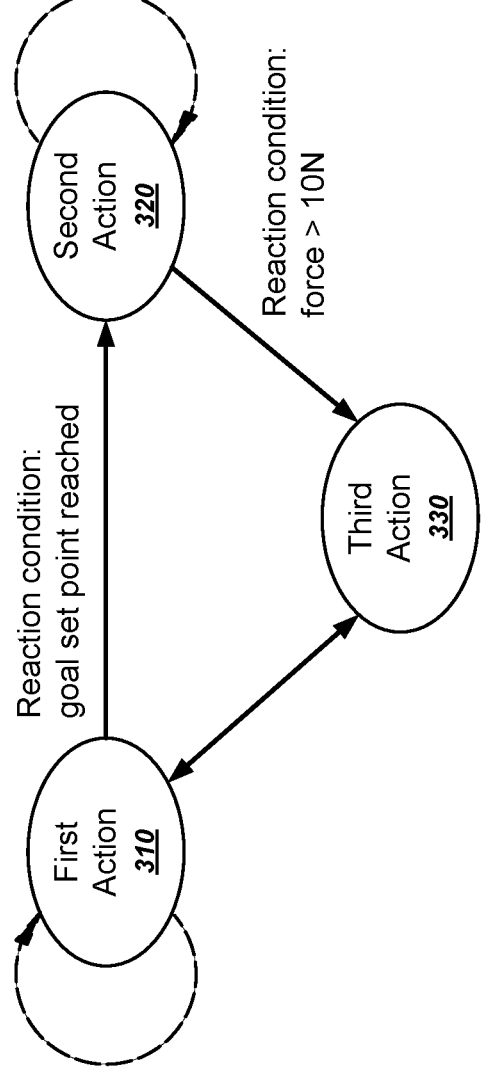
FIG. 3

ROBOTIC CONTROL WITH REAL-TIME SWITCHING BETWEEN TRAJECTORIES

CROSS-REFERENCE TO RELATED APPLICATIONS

This application claims priority to U.S. Provisional Application No. 63/435,507, filed on Dec. 27, 2022. The disclosure of the prior application is considered part of and is incorporated by reference in the disclosure of this application.

BACKGROUND

This specification relates to frameworks for software control systems.

Real-time software control systems are software systems that must execute within strict timing requirements to achieve normal operation. The timing requirements often specify that certain actions must be executed or outputs must be generated within a particular time window in order for the system to avoid entering a fault state. In the fault state, the system can halt execution or take some other action that interrupts normal operation. Such real-time software control systems are often used to control physical machines that have high precision and timing requirements. As one example, a workcell of industrial robots can be controlled by a real-time software control system that requires each robot to repeatedly receive commands at a certain frequency, e.g., 1, 10, or 100 kHz. If one of the robots does not receive a command during one of the periodic time windows, the robot can enter a fault state by halting its operation or by automatically executing a recovery procedure to return to a maintenance position. In this specification, a workcell is the physical environment in which a robot will operate. Workcells have particular physical properties, e.g., physical dimensions that impose constraints on how robots can move within the workcell.

Due to such timing requirements, software control systems for physical machines are often implemented by closed software modules that are configured specifically for highly-specialized tasks. For example, a robot that picks components for placement on a printed circuit board can be controlled by a closed software system that controls each of the low-level picking and placing actions. Due to such timing requirements, real-time control of the robot typically adheres to following a single planned trajectory over multiple time windows, e.g., until completion of the trajectory.

SUMMARY

This specification describes a real-time robotic control framework that provides a unified platform for achieving multiple new capabilities for custom real-time control. In particular, the real-time robotic control framework facilitates real-time switching between different trajectories in accordance with user-defined switching criteria when controlling one or more physical robots to complete a particular task.

In this specification, a framework is a software system that allows a user to provide higher level program definitions while implementing the lower level control functionality of a real-time robotic system. In this specification, the operating environment includes multiple subsystems, each of which can include one or more real-time robots, one or more computing devices having software or hardware modules that support the operation of the robots, or both. The framework provides mechanisms for bridging, communication, or coordination between the multiple systems, including forwarding control parameters from a robot application system, providing sensor measurements to a real-time robotic control system for use in computing the custom action, and receiving hardware control inputs computed for the custom action from the real-time robotic control system, all while maintaining the tight timing constraints of the real-time robot control system, e.g., at the order of one millisecond.

Particular embodiments of the subject matter described in this specification can be implemented so as to realize one or more of the following advantages.

The disclosed real-time robotic control framework provides additional capabilities for a robot to react in a more timely and comprehensive manner, which results in higher precision movements, shorter cycle times, and more reliability when completing a particular task. By allowing a user to define various target trajectories and, in particular, switching criteria for real-time switching from a trajectory currently being followed by the robot to another trajectory which can either be pre-planned or feedback-controlled, e.g., within every millisecond, or even lesser, the disclosed control framework facilitates performance of challenging tasks by the robot with higher accuracy and fewer failures. The disclosed control framework can be especially effective in controlling the robot in various contact-rich, force-controlled robot manipulation tasks (e.g., force-sensitive assembly, polishing, and insertion of parts) and visual-guided robot control tasks (e.g., visual picking of moving objects, handling objects without fixtures, and handling of deformable objects).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart of an example process for performing a real-time switching between trajectories.

FIG. 3 illustrates an example of a real-time state machine of actions that are related by custom real-time reactions.

Like reference numbers and designations in the various drawings indicate like elements.

DETAILED DESCRIPTION

Figure 1:
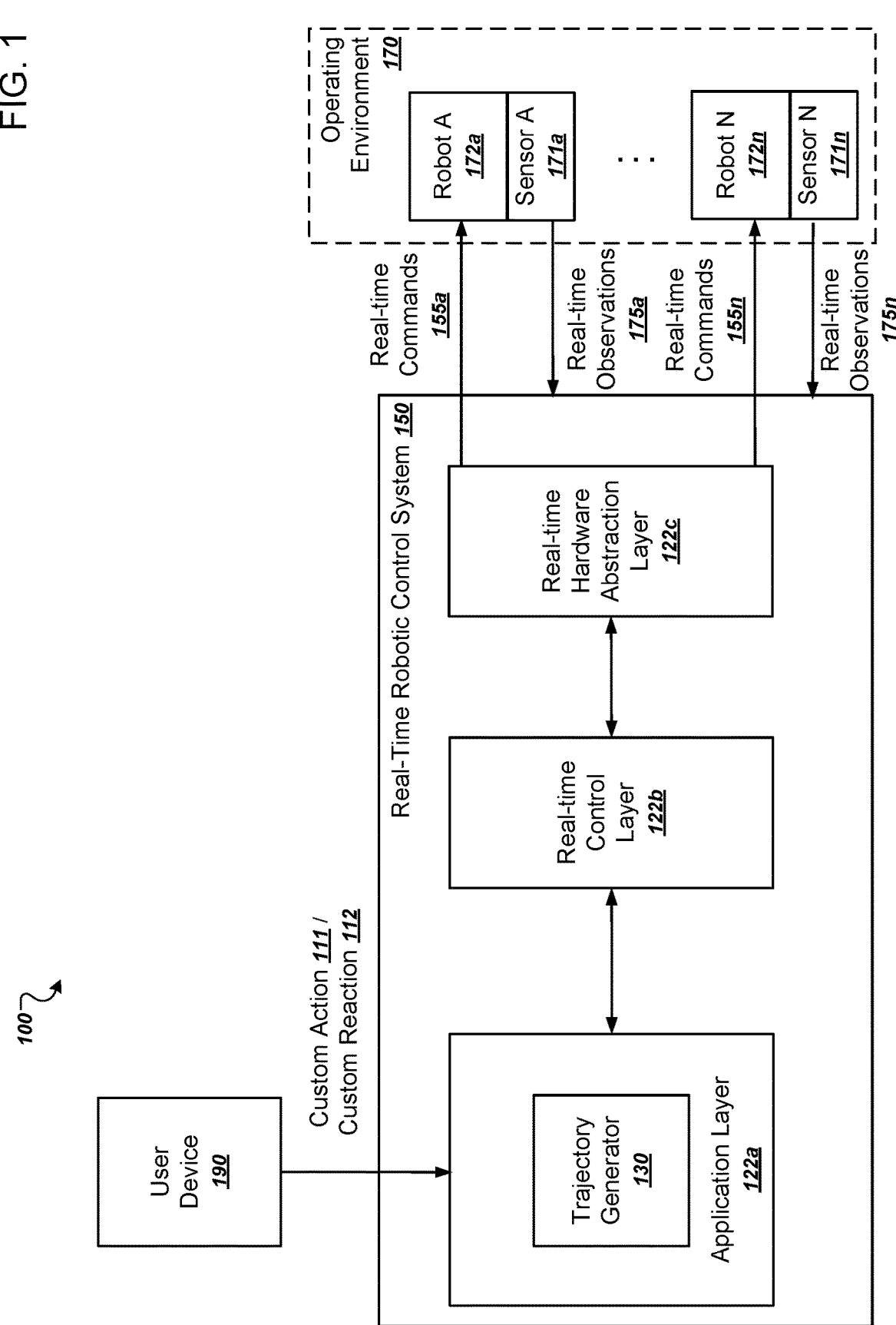
FIG. 1 is a diagram of an example system.

FIG. 1 is a diagram of an example system 100. The system 100 includes a real-time robotic control system 150 to drive multiple robots 172*a-n* in an operating environment 170. The system 100 includes a number of functional components that can each be implemented as computer programs installed on one or more computers in one or more locations that are coupled to each other through any appropriate communications network, e.g., an intranet or the Internet, or combination of networks.

The system 100 is an example of a system that can implement the real-time robotic control framework as described in this specification. In particular, the system 100 can provide a unified framework that allows users to achieve multiple different types of custom real-time control. In this specification, a robotic control system being described as being real-time means that it is required to execute within strict timing requirements to achieve normal operation. The timing requirements specify that certain actions must be executed or outputs must be generated within a particular time window in order for the system to avoid entering a fault state. For brevity, each time window may be referred to as a tick or a control tick. In the fault state, after a tick has elapsed without completing its required computations or actions, the system can halt execution or take some other action that interrupts normal operation, e.g., returning the robots to a starting pose or a fault pose.

Operations, e.g., processing steps for completing a task or function, in a non-real-time system are known as non-deterministic operations, which are not required to complete within a given tick to be successful. In contrast, a real-time system requires deterministic operations, which are required to occur every tick. In non-real-time and real-time systems, a scheduler may be utilized to determine the amount of resources, e.g., network bandwidth, memory, processor cycles, or a combination thereof, that an action is allotted for execution. If no or inadequate resources are allocated, the real-time system can also enter the fault state.

The real-time robotic control system 150 is configured to control the robots 172a-n in the operating environment 170 according to custom real-time control information. To control the robots 172a-n in the operating environment 170, the real-time robotic control system 150 provides commands, e.g., commands 155a-n, to be executed by one or more robots, e.g., robots 172a-n, in the operating environment 170. In order to compute the commands 155, the real-time robotic control system 150 consumes real-time observations 175a-n made by one or more sensors 171a-n gathering data within the operating environment 170. As illustrated in FIG. 1, each sensor 171 is coupled to a respective robot 172. However, the sensors need not have a one-to-one correspondence with robots and need not be coupled to the robots. In fact, each robot can have multiple sensors, and the sensors can be mounted on stationary or movable surfaces in the operating environment 170. Any suitable sensors 171 can be used, such as distance sensors, force sensors, torque sensors, cameras, to name just a few examples.

A user of the system 100 can initiate the execution of custom real-time control by providing custom real-time control information to the real-time robotic control system 150. For example, a user can use a user device 190 to provide custom real-time control information to the application layer 122a. For example, through an integrated development environment (IDE) executed in the user device 190, the user can write code and create configuration files that are required to facilitate various types of custom real-time control, including custom real-time actions 111 and custom real-time reactions 112. In some examples, the user code can be expressed in high-level programming languages, e.g., Object Oriented Programming (OOP) languages, including C++, Python, Lua, and Go; and the configuration file can be written as a metadata file, e.g., an XML (extensible mark-up language) file, a YAML file, or a JSON (JavaScript Object Notation) file.

In this specification, an action refers to a motion having precomputed motion parameters, such as moving a tool on a robot arm from point A to point B. A user can define a custom real-time action by specifying a set of movement parameters. The movement parameters can be precomputed, which means that they can be generated before the action is defined, for example, as computed by a cloud-based motion planner. The user device 190 can provide the definition of the custom real-time action 111 to the real-time control layer 122b, which can then initialize all the motion parameters and other state variables for real-time execution.

Some custom real-time actions 111 are trajectory tracking actions. A trajectory tracking action takes as input a fully-samples trajectory object, or another object that allows real-time queries of joint position setpoints.

For example, the state residual between the actual joint state and the desired trajectory can be arbitrarily large, especially after switching to a new trajectory that begins somewhere else. Because of this, in the control function, the trajectory tracking action can compute the time-optimal trajectory in each tick, e.g., by using a real-time trajectory generator, from the actual state to the next desired trajectory state, and use the next tick as a control setpoint. This real-time trajectory generation avoids exceeding any kinematic limits, at the expense of residuals.

As another example, the trajectory tracking action can define a control law that uses feedforward terms to reduce residual state (position, velocity, and/or acceleration) and then applies limits.

In this specification, a reaction refers to a real-time switch between actions due to certain one or more specified conditions. As an example, two movement actions can be chained together by associating a first action with a reaction condition that represents the end of the first action. When the condition is satisfied, the real-time control layer 122b will automatically and in real time switch to performing the second action. In other words, the real-time control layer 122b need not wait for confirmation or an instruction from a higher-level controller to begin execution of the second action.

In some cases, a reaction has a condition that defined in the form of a Boolean expression of multiple state variables offered by the trajectory tracking action and hardware part status. For example, the first trajectory could be a motion to contact, and the reaction have a condition to switch to another action (to render contact control) exactly when a force sensor measures an external force that is greater than a given threshold force value. As another example, a trajectory tracking action includes a state variable "distance to goal," and the reaction is triggered when the distance to the final trajectory setpoint is smaller than a given threshold distance value.

In some cases, the custom real-time control information can be provided by the user in the form of a real-time state machine of actions that are related by custom reactions. In this specification, a real-time state machine is a representation of the operational transitions to be performed by a robot. A real-time state machine includes nodes and edges, where each node represents a real-time state of the robot or a set of actions that the robot can execute, and each edge between a first node and a second node represents one or more "switching conditions" that, if satisfied, cause the robot to switch from executing the action represented by the first node to executing the action represented by the second node. Thus, when the system is in a particular node of the real-time state machine, the system is sending real-time commands to drive the robot to execute the actions represented by the particular node, while continuously monitoring the switching conditions of the node. Whenever one of the switching conditions are met, the system can transition to a different node of the real-time state machine by sending different real-time commands to cause the robot to be in a state represented by the different node of the real-time state machine. More details about defining a state machine using user code are described in commonly owned U.S. patent application Ser. No. 17/246,082, which is herein incorporated by reference.

In some cases, the custom real-time control information can be provided by the user or another entity in the form of a skill. Each skill, which may also be referred to as a skill template, in turn can define a state machine of actions and corresponding switching conditions that dictate under what conditions a robot executing the skill should make a switch from executing one action to executing another action. Skills are designed to be highly modular and reusable so that a skill can be developed by one entity and used by another entity without the entities having a preexisting relationship and without coordinating their activities. For example, developers for a vehicle manufacturer can develop a skill for assembling a vehicle door for a particular model of a vehicle. The skill can then be shipped to manufacturing facilities elsewhere, where the skill will be adapted to execute according to local conditions. As another example, a third-party developer can develop a skill for using an in-home consumer robot to assemble a consumer product, e.g., a bookshelf or a desk. As another example, developers can generate a skill for performing connector insertion, e.g., for HDMI or USB cables. The skill can then be distributed to robot installations elsewhere to be rapidly adapted for different local conditions, even when the other installations use different types of connectors or different robots. More details about skill templates are described in commonly owned U.S. patent application Ser. No. 16/880,869, which is herein incorporated by reference.

The real-time robotic control system 150 can then prepare the custom real-time control code for execution. Generally, the real-time robotic control system 150 can provide commands through a control stack 122 that handles providing real-time control commands 155*a-n* to the robots 172*a-n*. The control stack 122 can be implemented as a software stack that is at least partially hardware-agnostic. In other words, in some implementations the software stack can accept, as input, commands generated by the control system 150 without requiring the commands to relate specifically to a particular model of robot or to a particular robotic component.

The control stack 122 includes multiple levels, with each level having one or more corresponding software modules. In FIG. 1, the lowest level is the real-time hardware abstraction layer 122*c* which executes within strict real-time requirements, e.g., by providing a command at a first, fixed rate, e.g., every 1, 5, 10, or 20 milliseconds, and the highest level is the application layer 122*a* which executes within non-real-time requirements, e.g., by providing a command at second, lower rate, which may sometimes be a varying rate or a rate that is sporadic, or both. Interposed between the non-real-time application layer 122*a* and the real-time hardware abstraction layer 122*c* is a control layer 122*b*, which handles bridging the boundary between the non-real-time commands generated by upper-level software modules in the control stack 122 and the real-time commands generated by the lower-level software modules in the control stack 122. More details of the control stack 122 are described in commonly owned U.S. patent application Ser. No. 17/246, 082.

The application layer 122*a* implements software modules that compute target trajectory information for the robots 172*a-n*. One example of such software modules is the trajectory generator 130 shown in FIG. 1, which is configured to generate target trajectory information that includes at least a trajectory set point (or goal state) for a robot component, e.g., a robot joint, and optionally other metadata. A set point can include for each moment in a particular time period, one or more of a position, a velocity, or an acceleration for the robot component. The trajectory generated by the trajectory generator 130 may be in Cartesian-space or joint-space coordinates.

The trajectory information can be consumed by the real-time control layer 122*b*, which use the trajectory information to produce continuous real-time control signals including, e.g., real-time positions, velocities, or torques for a robot component such as a robot joint, which determine how to drive the motors and actuators of the robots 172*a-n* in order to follow the target trajectory. The continuous real-time control signals can then be consumed by the hardware abstraction layer 122*c*. The hardware abstraction layer 122*c* can include software module, e.g., a real-time controller module, that interfaces the robot 172*a-n*, e.g., by issuing real-time commands 155*a-n* to drive the movements of the moveable components such as joints of the robots 172*a-n* in the operating environment 170 to follow the target trajectory.

A powerful feature of the framework described in this specification is the integration of trajectory tracking into a real-time state machine which facilitates real-time switching between different trajectories, i.e., real-time switching between termination of a first trajectory and the beginning of a second trajectory. One way of doing this is to have a custom real-time action that, when executed, causes a robot component to follow the first trajectory and, in the meantime, have the conditions associated with custom real-time reactions depend on the first trajectory that is being followed by the robot component (by virtue of executing the custom real-time action).

For example, a user can define a custom real-time action that controls a robot arm to follow a first trajectory of Cartesian positions; the user can also define a custom real-time reaction that switches to another custom real-time action that controls the robot arm to follow a second trajectory when the robot arm is below a threshold distance, e.g., 1 cm, 5 cm, 10 cm, etc., away from a goal Cartesian position in the first trajectory. By doing so, the real-time control layer 122*b* can automatically and in real-time switch to follow the second trajectory when near (and not necessarily until the full) completion of the first trajectory. Importantly, the real-time control layer 122*b* need not evaluate a high level plan or spend time computing the second trajectory. All real-time switches between trajectories can be explicitly specified by the user's custom real-time control information, which allows for highly reliable real-time switching between trajectories.

FIG. 2 is a flowchart of an example process 200 for performing a real-time switching between trajectories. The process can be implemented by one or more computer programs installed on one or more computers and programmed in accordance with this specification. For example, the process can be performed by the real-time robotic control system 150 shown in FIG. 1. For convenience, the process will be described as being performed by a system of one or more computers.

The system obtains respective definitions of multiple trajectories for one or more physical robots in an operating environment (210). The definitions of the trajectories may be generated by one or more trajectory generators (or some other software modules) included in the application layer of the real-time robotic control system. The multiple trajectories may correspond to common or distinct segments of a particular task to be performed by one or more physical robots. In the example of an insertion task, a robot can follow a first trajectory, e.g., a position controlled trajectory, to perform a first segment of the task, such as to move a robot arm to follow a path in free space. The robot can follow a second trajectory, e.g., a force controlled trajectory, to perform a second segment of the task, such as to move the robot arm to follow a path into an actual workpiece.

Different trajectory generators and/or different entities can generally define different types of trajectories. For example, some trajectories may be pre-planned, feedforward controlled trajectories, while some other trajectories may be feedback controlled trajectories. Examples of a pre-planned, feedforward controlled trajectory include a feedforward position controlled trajectory, which can specify a predetermined sequence of joint positions or a predetermined sequence of Cartesian positions (with each position being a set point), a feedforward velocity controlled trajectory, which can specify a predetermined sequence of velocity values, and a feedforward acceleration controlled trajectory, which can specify a predetermined sequence of acceleration values. Moreover, each pre-planned, feedforward controlled trajectory may define a set point based on a time of a current tick of the real-time robotic control system. That is, the pre-planned feedforward trajectories may be functions of time specifying not only the sequence of set points but also the transitions between the set points as the function of time.

Feedback controlled trajectories are trajectories that are defined based on status messages generated by other software modules in the control stack, real-time observations captured by one or more sensors, or both, and possibly other feedback signals from the operating environment that includes the one or more physical robots. Examples of a feedback controlled trajectory include a feedback force controlled trajectory, which can control the motion of a robot after a force, for example a contact force upon striking a workpiece or an obstacle, is measured by a force sensor of the robot either directly or indirectly, and a feedback position (or velocity or acceleration) controlled trajectory, which can control the motion of the robot after a position (or velocity or acceleration) of the robot is reported by a controller of the robot. Each feedback controlled trajectory can be defined using one or more of: segment parameters, such as a desired constant velocity parameter, a velocity limit parameter, or an acceleration limit parameter, or blending parameters, such as a blending scheme selection parameter or a maximum deviation parameter. Like the pre-planned feedforward trajectories, the feedback controlled trajectories may be functions of time that define a set point based on a time of a current tick of the real-time robotic control system.

The system obtains a definition of a real-time state machine (220). The definition of the real-time state machine may be provided by a user of the system or another entity. The real-time state machine specifies a sequence of custom real-time actions to be executed with deterministic timing and one or more custom real-time reactions that chain the sequence of actions. Each custom real-time action can generally be a trajectory tracking action for controlling the robot to follow one or more of the multiple trajectories obtained in step 210; thus just as the trajectories, these actions may correspond respectively to the different segments of the particular task to be performed by the one or more physical robots. To chain the sequence of actions, each reaction can include one or more conditions for real-time switching between a pair of actions in the plurality of actions, i.e., the switching criteria for a real-time switching from a trajectory currently being followed by the robot to another trajectory.

The system repeatedly performs following steps 230-260 at each tick of the real-time robotic control system to execute, in accordance with a control schedule that has been determined in advance, custom real-time actions to drive the one or more physical robot to follow the trajectories. For example, the system can repeatedly execute the real-time state machine at each tick. At each tick of the system, the custom real-time action that is being executed as of the tick will be referred to as a "current action" below.

The system executes a current action which can be a trajectory tracking action for controlling the robot to follow a sequence of set points of the first trajectory (230). In the cases where the first trajectory is a feedback controlled trajectory, the current action can consume sensor inputs in real-time.

The system obtains current data representing a latest execution status of the current action (240). For example, the current data can include real-time sensor inputs. Such real-time sensor inputs can be generated, for example, by a distance sensor, a force sensor, a torque sensor, a camera, or the like that makes real-time measurements in the operating environment. As another example, the current data can include status messages reported by a controller of the robot. Such status messages can include, for example, a current joint configuration of the robot, or a current position, velocity, or acceleration value of the robot. As another example, the current data can include state variables associated with the first trajectory that is currently being traversed. The state variables, the choice of which may be user-specified, can include sensor values or information derived from the sensor values or both. The state variables may each be associated with one or more numeric values. For example, the state variables can include torque reading, velocity, position, or orientation of a robot component such as a joint. As another example, one state variable can characterize a progress of the robot toward completing the current action, e.g., the distance to a next set point in the sequence of set points of the first trajectory.

The system evaluates one or more switching criteria associated with the current action according to the current data (250). Each switching criterion defines one or more conditions for real-time trajectory switching. Each condition can generally be defined relative to the current data that is updated in real-time. For example, a condition can be defined relative to a latest execution status of the first trajectory, e.g., whether a given set point has been reached by a robot component, whether a distance from the robot component to a given set point reaches a threshold distance, whether a given set point will be reached by the robot component within a threshold time period, or the like. As another example, a condition can be defined relative to the real-time sensor inputs, e.g., a contact force in a certain direction measured by a force sensor arranged at a robot end effector or an actuator. As another example, a condition can be defined relative to a latest operation status of the robot, e.g., whether the robot has attained a given joint configuration. As another example, a condition can be defined relative to an internal state of the current action, e.g., whether an admittance controller has settled to approximately zero velocity value. As yet another example, a condition can be defined relative to one or more of the state variables associated with the first trajectory. For example, a condition can be a logical term of multiple such state variables, e.g., if at least one of (i) a goal set point is reached or (ii) a contact force has reached a threshold value holds true.

Whenever the one or more switching criteria are satisfied during the tick, the system switches to executing another action for controlling the robot to follow the second trajectory (260). The system can determine satisfaction of a switching criterion if the one or more conditions of the switching criterion are met. Thus, within the same tick that begins with executing the current action for controlling the robot to follow the first trajectory, the system can perform a real-time switching to begin executing the other action for controlling the robot to follow the second trajectory. In particular, the system can terminate execution of the current action before completion of the current action, e.g., before the robot reaches a goal set point in the sequence of set points of the first trajectory, and sometimes even before the robot reaches a next set point subsequent to a current point that has been reached by the robot.

A detailed example of performing a real-time switching between trajectories will now be described.

FIG. 3 illustrates an example of a real-time state machine of actions that are related by custom real-time reactions. In FIG. 3, a robot has been configured to perform a peg-in-the-hole type assembly task in an operating environment, e.g., in a workcell. In a peg-in-hole type assembly task, an inserting part (e.g., a cylindrical peg or rod) is gripped at the end of a robot arm of the robot and is directed by the robot arm to a receiving part having a hole in which the inserting part is inserted.

The example real-time state machine 300 illustrated in FIG. 3 begins with a first action 310 by the robot. The first action 310 can be a trajectory tracking action for following a first trajectory which corresponds to a first segment of the assembly task. The first trajectory can be a pre-planned, feedforward controlled trajectory that specifies a predetermined sequence of set points, with each set point being a joint position or a Cartesian position of the robot.

While executing the first action 310 to control the robot to follow first trajectory, the system evaluates whether one or more switching conditions of the reaction associated with the first action 310 is satisfied. As described above, each action can be associated with multiple reactions, each with one or more switching conditions. Evaluating the switching conditions can consume the current data that represents a latest execution status of the first action 310.

In this example, the system can repeatedly obtain status messages that specify a current joint configuration or a current position of the robot, and determined based on the status messages whether a goal set point in the predetermined sequence of set points of the first trajectory has been reached by the robot. The system can also repeatedly obtain real-time sensor inputs generated by a force sensor arranged on a robot end effector, and determined based on the sensor inputs whether a contact force is above a threshold value, e.g., greater than 0 N (indicating that the robot end effector comes in contact with a surface of the receiving part).

If either the goal set point is reached or the contact force is above the threshold value, then a switching condition of the reaction is satisfied, and the system switches in real-time to a next action according to the state machine. Thus, the system can switch in real-time to the second action 320.

If neither is the goal set point reached nor is the contact force above the threshold value, then the switching condition of the reaction is not satisfied, and the system performs the next control tick for the first action 310 to continue to control the robot to follow the predetermined sequence of set points of the first trajectory. Thus, when the actions and reactions are used to define a state machine, there is an implicit loop back transition (illustrated in dashed lines) whenever a condition of a reaction is not satisfied.

The second action 320 can be a trajectory tracking action for following a second trajectory which corresponds to a second segment of the assembly task. The second trajectory can be a feedback force controlled trajectory that controls the motion of the robot, e.g., by moving a robot end effector up or down, such that a contact force in a vertical direction is maintained within a desired range, e.g., 5-10 N.

While executing the second action 320 to control the robot to follow second trajectory, the system evaluates whether a switching condition of the reaction associated with the second action 320 is satisfied. In this example, the system can repeatedly obtain real-time sensor inputs generated by a force sensor arranged on the robot end effector, and determined based on the sensor inputs whether the contact force is above a threshold value of 10 N (indicating that the robot end effector reaches a bottom of the hole in the receiving part).

If the contact force has reached the threshold value, then the switching condition of the reaction is satisfied, and the system switches in real-time to a next action according to the state machine. Thus, the system can switch in real-time to the third action 330. The third action 330 can be a trajectory tracking action for following a third trajectory which corresponds to a third segment of the assembly task. The third trajectory similarly can be a feedback force controlled trajectory that controls the motion of the robot, e.g., by following a spiral trajectory defined relative to a radius and rotation angle, such that a contact force is maintained within a desired range.

If the contact force has not reached the threshold value, then the switching condition of the reaction is not satisfied, and the system performs the next control tick for the second action 320 to continue to control the robot to follow the second trajectory.

The robot functionalities described in this specification can be implemented by a hardware-agnostic software stack, or, for brevity just a software stack, that is at least partially hardware-agnostic. In other words, the software stack can accept as input commands generated by the planning processes described above without requiring the commands to relate specifically to a particular model of robot or to a particular robotic component. For example, the software stack can be implemented at least partially by the real-time robotic control system 150 of FIG. 1.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an operating environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method performed by a real-time robotic control system, the method comprising:

obtaining a definition of a first trajectory for a robot to follow for a first segment of a task and a definition of a second trajectory for the robot to follow for a second segment of the task, wherein each of the first trajectory and the second trajectory define a set point based on a time of a current control tick of the real-time robotic control system;

executing a current action for controlling the robot to follow set points of the first trajectory at each control tick of the real-time robotic control system, including, at each control tick of the real-time robotic control system:

obtaining current data representing a latest execution status of the current action;

evaluating one or more switching criteria associated with the current action according to the current data, wherein each switching criterion defines one or more conditions for real-time trajectory switching; and whenever the one or more switching criteria are satisfied during the control tick, switching to executing another action for controlling the robot to follow the second trajectory within the control tick.

Embodiment 2 is the method of embodiment 1, wherein the first trajectory is a pre-planned, feedforward controlled trajectory, and the second trajectory is a feedback controlled trajectory.

Embodiment 3 is the method of any one of embodiments 1-2, wherein receiving the definition of the first and second trajectories comprises receiving a definition of a real-time state machine of actions that are related by reactions.

Embodiment 4 is the method of embodiment 3, wherein the actions correspond respectively to different segments of the task to be performed by the robot, and the reactions correspond respectively to respective switching criteria.

Embodiment 5 is the method of any one of embodiments 3-4, wherein an action corresponding to the feedback controlled trajectory uses sensor inputs in real-time.

Embodiment 6 is the method of any one of embodiments 2-5, wherein the pre-planned, feedforward controlled trajectory comprises: a predetermined trajectory of joint positions, a predetermined trajectory of Cartesian positions, or a predetermined trajectory of velocities.

Embodiment 7 is the method of any one of embodiments 2-5, wherein the feedback controlled trajectory is defined using one or more of: segment parameters, comprising a desired constant velocity parameter, a velocity limit parameter, and an acceleration limit parameter, or blending parameters, comprising a blending scheme selection parameter and a maximum deviation parameter.

Embodiment 8 is the method of any one of embodiments 1-7, wherein the conditions are defined relative to a latest execution status of the first trajectory.

Embodiment 9 is the method of any one of embodiments 1-8, wherein the conditions are defined relative to real-time sensor inputs, and wherein obtaining the current data characterizing the latest execution status of the current action comprises obtaining the real-time sensor inputs.

Embodiment 10 is the method of any one of embodiments 1-9, wherein the conditions are defined relative to one or more state variables associated with the first trajectory, and wherein obtaining current data characterizing the latest execution status of the current action comprises obtaining current values of the one or more state variables.

Embodiment 11 is the method of any one of embodiments 1-10, wherein the conditions are defined relative to a latest operation status of the robot, and wherein obtaining current data characterizing the latest execution status of the current action comprises obtaining status messages reported by a controller of the robot.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is a computer storage medium encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by a real-time robotic control system, the method comprising:

generating, by one or more trajectory generators that execute in an application layer of the real-time robotic control system, a first trajectory comprising a first plurality of set points for a robot to follow for a first segment of a task and a second trajectory comprising a second plurality of set points for the robot to follow for a second segment of the task, wherein the application layer executes in accordance with a non-real-time requirement and generates the first plurality of set points in the first trajectory and the second plurality of set points in the second trajectory at a non-real-time rate, the non-real-time rate being different from a real-time rate that is defined by a timing of control ticks of the real-time robotic control system; and controlling, by a real-time control layer of the real-time robotic control system that executes in accordance with a real-time requirement, the robot to perform the task, the controlling comprising:

generating, by the real-time control layer of the real-time robotic control system and based on the first trajectory, control signals for a robot component of the robot to track the first plurality of set points, wherein the real-time control layer generates the control signals at the real-time rate by generating, at a control tick of the real-time robotic control system, at least one control signal for the robot component to track a next set point in the first plurality of set points;

obtaining, by the real-time control layer of the real-time robotic control system, current data representing a latest execution status of the first trajectory by the robot at the control tick of the real-time robotic control system;

evaluating, by the real-time control layer of the real-time robotic control system and at the control tick of the real-time robotic control system, one or more switching criteria associated with the first trajectory according to the current data, wherein each switching criterion defines one or more conditions for real-time trajectory switching; and in response to determining that the one or more switching criteria are satisfied during the control tick, terminating, by the real-time control layer of the real-time robotic control system, controlling of the robot to track the first plurality of set points and switching to controlling the robot to track the second plurality of set points in the second trajectory within the control tick that begins with controlling of the robot to track the next set point in the first plurality of set points.

2. The method of claim 1, wherein the first trajectory is a pre-planned, feedforward controlled trajectory, and the second trajectory is a feedback controlled trajectory.

3. The method of claim 1, further comprising:

receiving, by the real-time robotic control system, a definition of a real-time state machine of actions that are related by reactions.

4. The method of claim 3, wherein the actions correspond respectively to different segments of the task to be performed by the robot, and the reactions correspond respectively to respective switching criteria.

5. The method of claim 4, wherein the actions comprise a first trajectory tracking action corresponding to the first trajectory and a second trajectory tracking action corresponding to the second trajectory.

6. The method of claim 2, wherein the pre-planned, feedforward controlled trajectory comprises: a predetermined trajectory of joint positions, a predetermined trajectory of Cartesian positions, or a predetermined trajectory of velocities.

7. The method of claim 2, wherein the feedback controlled trajectory is defined using one or more of: segment parameters, comprising a desired constant velocity parameter, a velocity limit parameter, and an acceleration limit parameter, or blending parameters, comprising a blending scheme selection parameter and a maximum deviation parameter.

8. The method of claim 1, wherein the conditions are defined relative to the latest execution status of the first trajectory by the robot at the control tick of the real-time robotic control system.

9. The method of claim 1, wherein the conditions are defined relative to real-time sensor inputs, and wherein obtaining the current data representing the latest execution status of the first trajectory comprises obtaining the real-time sensor inputs.

10. The method of claim 1, wherein the conditions are defined relative to one or more state variables associated with the first trajectory, and wherein obtaining current data representing the latest execution status of the first trajectory comprises obtaining current values of the one or more state variables.

11. The method of claim 1, wherein the conditions are defined relative to a latest operation status of the robot, and wherein obtaining current data representing the latest execution status of the first trajectory comprises obtaining status messages reported by a controller of the robot.

12. The method of claim 1, wherein the non-real-time rate is slower than the real-time rate.

13. The method of claim 1, wherein the non-real-time rate is a varying rate or a sporadic rate.

14. A real-time robotic control system comprising: one or more computers and one or more storage devices storing instructions that are operable, when executed by the one or more computers, to cause the one or more computers to perform operations comprising:

generating, by one or more trajectory generators that execute in an application layer of the real-time robotic control system, a first trajectory comprising a first plurality of set points for a robot to follow for a first segment of a task and a second trajectory comprising a second plurality of set points for the robot to follow for a second segment of the task, wherein the application layer executes in accordance with a non-real-time requirement and generates the first plurality of set points in the first trajectory and the second plurality of set points in the second trajectory at a non-real-time rate, the non-real-time rate being different from a real-time rate that is defined by a timing of control ticks of the real-time robotic control system; and controlling, by a real-time control layer of the real-time robotic control system that executes in accordance with a real-time requirement, the robot to perform the task, the controlling comprising:

generating, by the real-time control layer of the real-time robotic control system and based on the first trajectory, control signals for a robot component of the robot to track the first plurality of set points, wherein the real-time control layer generates the control signals at the real-time rate by generating, at a control tick of the real-time robotic control system, at least one control signal for the robot component to track a next set point in the first plurality of set points;

obtaining, by the real-time control layer of the real-time robotic control system, current data representing a latest execution status of the first trajectory by the robot at the control tick of the real-time robotic control system;

evaluating, by the real-time control layer of the real-time robotic control system and at the control tick of the real-time robotic control system, one or more switching criteria associated with the first trajectory according to the current data, wherein each switching criterion defines one or more conditions for real-time trajectory switching; and in response to determining that the one or more switching criteria are satisfied during the control tick, terminating, by the real-time control layer of the real-time robotic control system, controlling of the robot to track the first plurality of set points and switching to controlling the robot to track the second plurality of set points in the second trajectory within the control tick that begins with controlling of the robot to track the next set point in the first plurality of set points.

15. The system of claim 14, wherein the first trajectory is a pre-planned, feedforward controlled trajectory, and the second trajectory is a feedback controlled trajectory.

16. The system of claim 14, wherein the operations further comprise:

receiving, by the real-time robotic control system, a definition of a real-time state machine of actions that are related by reactions.

17. The system of claim 16, wherein the actions correspond respectively to different segments of the task to be performed by the robot, and the reactions correspond respectively to respective switching criteria.

18. The system of claim 17, wherein the actions comprise a first trajectory tracking action corresponding to the first trajectory and a second trajectory tracking action corresponding to the second trajectory.

19. The system of claim 15, wherein the pre-planned, feedforward controlled trajectory comprises: a predetermined trajectory of joint positions, a predetermined trajectory of Cartesian positions, or a predetermined trajectory of velocities.

20. The system of claim 15, wherein the feedback controlled trajectory is defined using one or more of: segment parameters, comprising a desired constant velocity parameter, a velocity limit parameter, and an acceleration limit parameter, or blending parameters, comprising a blending scheme selection parameter and a maximum deviation parameter.

21. The system of claim 14, wherein the conditions are defined relative to the latest execution status of the first trajectory by the robot at the control tick of the real-time robotic control system.

22. A computer storage medium encoded with a computer program, the program comprising instructions that are operable, when executed by data processing apparatus, to cause the data processing apparatus to implement a real-time robotic control system configured to perform operations comprising:

generating, by one or more trajectory generators that execute in an application layer of the real-time robotic control system, a first trajectory comprising a first plurality of set points for a robot to follow for a first segment of a task and a second trajectory comprising a second plurality of set points for the robot to follow for a second segment of the task, wherein the application layer executes in accordance with a non-real-time requirement and generates the first plurality of set points in the first trajectory and the second plurality of set points in the second trajectory at a non-real-time rate, the non-real-time rate being different from a real-time rate that is defined by a timing of control ticks of the real-time robotic control system; and controlling, by a real-time control layer of the real-time robotic control system that executes in accordance with a real-time requirement, the robot to perform the task, the controlling comprising:

generating, by the real-time control layer of the real-time robotic control system and based on the first trajectory, control signals for a robot component of the robot to track the first plurality of set points, wherein the real-time control layer generates the control signals at the real-time rate by generating, at a control tick of the real-time robotic control system, at least one control signal for the robot component to track a next set point in the first plurality of set points;

obtaining, by the real-time control layer of the real-time robotic control system, current data representing a latest execution status of the first trajectory by the robot at the control tick of the real-time robotic control system;

evaluating, by the real-time control layer of the real-time robotic control system and at the control tick of the real-time robotic control system, one or more switching criteria associated with the first trajectory according to the current data, wherein each switching criterion defines one or more conditions for real-time trajectory switching; and in response to determining that the one or more switching criteria are satisfied during the control tick, terminating, by the real-time control layer of the real-time robotic control system, controlling of the robot to track the first plurality of set points and switching to controlling the robot to track the second plurality of set points in the second trajectory within the control tick that begins with controlling of the robot to track the next set point in the first plurality of set points.

* * * * *